US007499208B2

(12) United States Patent
Mignard

(10) Patent No.: US 7,499,208 B2
(45) Date of Patent: Mar. 3, 2009

(54) CURRENT MODE DISPLAY DRIVER CIRCUIT REALIZATION FEATURE

(75) Inventor: Marc Mignard, San Jose, CA (US)

(73) Assignee: UDC, LLC, San Francisco, CA (US)

( * ) Notice: Subject to any disclaimer, the term of this patent is extended or adjusted under 35 U.S.C. 154(b) by 188 days.

(21) Appl. No.: 11/182,389

(22) Filed: Jul. 15, 2005

(65) Prior Publication Data

US 2006/0056000 A1 Mar. 16, 2006

Related U.S. Application Data

(60) Provisional application No. 60/604,893, filed on Aug. 27, 2004.

(51) Int. Cl.
*G02F 1/03* (2006.01)
*G02B 26/00* (2006.01)

(52) U.S. Cl. ....................................... 359/245; 359/290

(58) Field of Classification Search .................. 359/245
See application file for complete search history.

(56) References Cited

U.S. PATENT DOCUMENTS

| | | | |
|---|---|---|---|
| 3,982,239 | A | 9/1976 | Sherr |
| 4,403,248 | A | 9/1983 | te Velde |
| 4,441,791 | A | 4/1984 | Hornbeck |
| 4,459,182 | A | 7/1984 | te Velde |
| 4,481,511 | A | 11/1984 | Hanmura et al. |
| 4,482,213 | A | 11/1984 | Piliavin et al. |
| 4,500,171 | A | 2/1985 | Penz et al. |
| 4,519,676 | A | 5/1985 | te Velde |
| 4,566,935 | A | 1/1986 | Hornbeck |
| 4,571,603 | A | 2/1986 | Hornbeck et al. |
| 4,596,992 | A | 6/1986 | Hornbeck |

(Continued)

FOREIGN PATENT DOCUMENTS

EP 0295802 A 12/1988

(Continued)

OTHER PUBLICATIONS

Peroulis et al., Low contact resistance series MEMS switches, 2002, pp. 223-226, vol. 1, IEEE MTT-S International Microwave Symposium Digest, New York, NY.

(Continued)

*Primary Examiner*—Jordon M. Schwartz
*Assistant Examiner*—James C Jones
(74) *Attorney, Agent, or Firm*—Knobbe Martens Olson & Bear LLP

(57) ABSTRACT

The invention comprises devices and methods for driving a MEMs pixel, and in particular, an interferornetric modulator pixel. In one embodiment a device for modulating light includes a light modulator including a movable optical element positionable in two or more positions, the modulator operating interferometrically to exhibit a different predetermined optical response in each of the two or more positions, and control circuitry connected to the light modulator for controlling said interferometric modulator, where the control circuitry is controllably switchable between two circuit configurations, and where the control circuitry provides a substantially constant current to said light modulator when switching between the two circuit configurations to cause the movable optical element of the light modulator to move between two positions of its two or more positions.

11 Claims, 12 Drawing Sheets

U.S. PATENT DOCUMENTS

| | | | |
|---|---|---|---|
| 4,615,595 | A | 10/1986 | Hornbeck |
| 4,636,784 | A | 1/1987 | Delgrange et al. |
| 4,662,746 | A | 5/1987 | Hornbeck |
| 4,681,403 | A | 7/1987 | te Velde et al. |
| 4,709,995 | A | 12/1987 | Kuribayashi et al. |
| 4,710,732 | A | 12/1987 | Hornbeck |
| 4,856,863 | A | 8/1989 | Sampsell et al. |
| 4,859,060 | A | 8/1989 | Katagiri et al. |
| 4,954,789 | A | 9/1990 | Sampsell |
| 4,956,619 | A | 9/1990 | Hornbeck |
| 4,980,775 | A | 12/1990 | Brody |
| 4,982,184 | A | 1/1991 | Kirkwood |
| 5,018,256 | A | 5/1991 | Hornbeck |
| 5,028,939 | A | 7/1991 | Hornbeck et al. |
| 5,037,173 | A | 8/1991 | Sampsell et al. |
| 5,055,833 | A | 10/1991 | Hehlen et al. |
| 5,061,049 | A | 10/1991 | Hornbeck |
| 5,078,479 | A | 1/1992 | Vuilleumier |
| 5,079,544 | A | 1/1992 | DeMond et al. |
| 5,083,857 | A | 1/1992 | Hornbeck |
| 5,096,279 | A | 3/1992 | Hornbeck et al. |
| 5,099,353 | A | 3/1992 | Hornbeck |
| 5,124,834 | A | 6/1992 | Cusano et al. |
| 5,142,405 | A | 8/1992 | Hornbeck |
| 5,142,414 | A | 8/1992 | Koehler et al. |
| 5,162,787 | A | 11/1992 | Thompson et al. |
| 5,168,406 | A | 12/1992 | Nelson |
| 5,170,156 | A | 12/1992 | DeMond et al. |
| 5,172,262 | A | 12/1992 | Hornbeck |
| 5,179,274 | A | 1/1993 | Sampsell |
| 5,192,395 | A | 3/1993 | Boysel et al. |
| 5,192,946 | A | 3/1993 | Thompson et al. |
| 5,206,629 | A | 4/1993 | DeMond et al. |
| 5,212,582 | A | 5/1993 | Nelson |
| 5,214,419 | A | 5/1993 | DeMond et al. |
| 5,214,420 | A | 5/1993 | Thompson et al. |
| 5,216,537 | A | 6/1993 | Hornbeck |
| 5,226,099 | A | 7/1993 | Mignardi et al. |
| 5,227,900 | A | 7/1993 | Inaba et al. |
| 5,231,532 | A | 7/1993 | Magel et al. |
| 5,233,385 | A | 8/1993 | Sampsell |
| 5,233,456 | A | 8/1993 | Nelson |
| 5,233,459 | A | 8/1993 | Bozler et al. |
| 5,254,980 | A | 10/1993 | Hendrix et al. |
| 5,272,473 | A | 12/1993 | Thompson et al. |
| 5,278,652 | A | 1/1994 | Urbanus et al. |
| 5,280,277 | A | 1/1994 | Hornbeck |
| 5,287,096 | A | 2/1994 | Thompson et al. |
| 5,287,215 | A | 2/1994 | Warde et al. |
| 5,296,950 | A | 3/1994 | Lin et al. |
| 5,305,640 | A | 4/1994 | Boysel et al. |
| 5,312,513 | A | 5/1994 | Florence et al. |
| 5,323,002 | A | 6/1994 | Sampsell et al. |
| 5,325,116 | A | 6/1994 | Sampsell |
| 5,327,286 | A | 7/1994 | Sampsell et al. |
| 5,331,454 | A | 7/1994 | Hornbeck |
| 5,339,116 | A | 8/1994 | Urbanus et al. |
| 5,365,283 | A | 11/1994 | Doherty et al. |
| 5,411,769 | A | 5/1995 | Hornbeck |
| 5,444,566 | A | 8/1995 | Gale et al. |
| 5,446,479 | A | 8/1995 | Thompson et al. |
| 5,448,314 | A | 9/1995 | Heimbuch et al. |
| 5,452,024 | A | 9/1995 | Sampsell |
| 5,454,906 | A | 10/1995 | Baker et al. |
| 5,457,493 | A | 10/1995 | Leddy et al. |
| 5,457,566 | A | 10/1995 | Sampsell et al. |
| 5,459,602 | A | 10/1995 | Sampsell |
| 5,461,411 | A | 10/1995 | Florence et al. |
| 5,475,397 | A | 12/1995 | Saidi |
| 5,488,505 | A | 1/1996 | Engle |
| 5,489,952 | A | 2/1996 | Gove et al. |
| 5,497,172 | A | 3/1996 | Doherty et al. |
| 5,497,197 | A | 3/1996 | Gove et al. |
| 5,499,062 | A | 3/1996 | Urbanus |
| 5,506,597 | A | 4/1996 | Thompson et al. |
| 5,515,076 | A | 5/1996 | Thompson et al. |
| 5,517,347 | A | 5/1996 | Sampsell |
| 5,523,803 | A | 6/1996 | Urbanus et al. |
| 5,526,051 | A | 6/1996 | Gove et al. |
| 5,526,172 | A | 6/1996 | Kanack |
| 5,526,688 | A | 6/1996 | Boysel et al. |
| 5,535,047 | A | 7/1996 | Hornbeck |
| 5,548,301 | A | 8/1996 | Kornher et al. |
| 5,551,293 | A | 9/1996 | Boysel et al. |
| 5,552,924 | A | 9/1996 | Tregilgas |
| 5,552,925 | A | 9/1996 | Worley |
| 5,563,398 | A | 10/1996 | Sampsell |
| 5,567,334 | A | 10/1996 | Baker et al. |
| 5,570,135 | A | 10/1996 | Gove et al. |
| 5,578,976 | A | 11/1996 | Yao |
| 5,581,272 | A | 12/1996 | Conner et al. |
| 5,583,688 | A | 12/1996 | Hornbeck |
| 5,589,852 | A | 12/1996 | Thompson et al. |
| 5,597,736 | A | 1/1997 | Sampsell |
| 5,598,565 | A | 1/1997 | Reinhardt |
| 5,600,383 | A | 2/1997 | Hornbeck |
| 5,602,671 | A | 2/1997 | Hornbeck |
| 5,606,441 | A | 2/1997 | Florence et al. |
| 5,608,468 | A | 3/1997 | Gove et al. |
| 5,610,438 | A | 3/1997 | Wallace et al. |
| 5,610,624 | A | 3/1997 | Bhuva |
| 5,610,625 | A | 3/1997 | Sampsell |
| 5,612,713 | A | 3/1997 | Bhuva et al. |
| 5,619,061 | A | 4/1997 | Goldsmith et al. |
| 5,619,365 | A | 4/1997 | Rhoads et al. |
| 5,619,366 | A | 4/1997 | Rhoads et al. |
| 5,629,790 | A | 5/1997 | Neukermans et al. |
| 5,633,652 | A | 5/1997 | Kanbe et al. |
| 5,636,052 | A | 6/1997 | Arney et al. |
| 5,638,084 | A | 6/1997 | Kalt |
| 5,638,946 | A | 6/1997 | Zavracky |
| 5,646,768 | A | 7/1997 | Kaeiyama |
| 5,650,881 | A | 7/1997 | Hornbeck |
| 5,654,741 | A | 8/1997 | Sampsell et al. |
| 5,657,099 | A | 8/1997 | Doherty et al. |
| 5,659,374 | A | 8/1997 | Gale, Jr. et al. |
| 5,665,997 | A | 9/1997 | Weaver et al. |
| 5,745,193 | A | 4/1998 | Urbanus et al. |
| 5,745,281 | A | 4/1998 | Yi et al. |
| 5,754,160 | A | 5/1998 | Shimizu et al. |
| 5,771,116 | A | 6/1998 | Miller et al. |
| 5,784,189 | A | 7/1998 | Bozler et al. |
| 5,784,212 | A | 7/1998 | Hornbeck |
| 5,808,780 | A | 9/1998 | McDonald |
| 5,818,095 | A | 10/1998 | Sampsell |
| 5,828,367 | A | 10/1998 | Kuga |
| 5,835,255 | A | 11/1998 | Miles |
| 5,842,088 | A | 11/1998 | Thompson |
| 5,867,302 | A | 2/1999 | Fleming et al. |
| 5,912,758 | A | 6/1999 | Knipe et al. |
| 5,943,158 | A | 8/1999 | Ford et al. |
| 5,959,763 | A | 9/1999 | Bozler et al. |
| 5,966,235 | A | 10/1999 | Walker et al. |
| 5,986,796 | A | 11/1999 | Miles |
| 6,028,690 | A | 2/2000 | Carter et al. |
| 6,038,056 | A | 3/2000 | Florence et al. |
| 6,040,937 | A | 3/2000 | Miles |
| 6,049,317 | A | 4/2000 | Thompson et al. |
| 6,055,090 | A | 4/2000 | Miles |
| 6,061,075 | A | 5/2000 | Nelson et al. |
| 6,099,132 | A | 8/2000 | Kaeriyama |
| 6,100,872 | A | 8/2000 | Aratani et al. |
| 6,113,239 | A | 9/2000 | Sampsell et al. |
| 6,147,790 | A | 11/2000 | Meier et al. |

| | | | |
|---|---|---|---|
| 6,160,833 | A | 12/2000 | Floyd et al. |
| 6,180,428 | B1 | 1/2001 | Peeters et al. |
| 6,201,633 | B1 | 3/2001 | Peeters et al. |
| 6,232,936 | B1 | 5/2001 | Gove et al. |
| 6,275,326 | B1 | 8/2001 | Bhalla et al. |
| 6,282,010 | B1 | 8/2001 | Sulzbach et al. |
| 6,295,154 | B1 | 9/2001 | Laor et al. |
| 6,304,297 | B1 | 10/2001 | Swan |
| 6,323,982 | B1 | 11/2001 | Hornbeck |
| 6,327,071 | B1 | 12/2001 | Koichi |
| 6,356,085 | B1 | 3/2002 | Ryat et al. |
| 6,356,254 | B1 | 3/2002 | Kimura |
| 6,429,601 | B1 | 8/2002 | Friend et al. |
| 6,433,917 | B1 | 8/2002 | Mei et al. |
| 6,447,126 | B1 | 9/2002 | Hornbeck |
| 6,465,355 | B1 | 10/2002 | Horsley |
| 6,466,358 | B2 | 10/2002 | Tew |
| 6,473,274 | B1 | 10/2002 | Maimone et al. |
| 6,480,177 | B2 | 11/2002 | Doherty et al. |
| 6,496,122 | B2 | 12/2002 | Sampsell |
| 6,501,107 | B1 | 12/2002 | Sinclair et al. |
| 6,507,330 | B1 | 1/2003 | Handschy et al. |
| 6,507,331 | B1 | 1/2003 | Schlangen et al. |
| 6,545,335 | B1 | 4/2003 | Chua et al. |
| 6,548,908 | B2 | 4/2003 | Chua et al. |
| 6,549,338 | B1 | 4/2003 | Wolverton et al. |
| 6,552,840 | B2 | 4/2003 | Knipe |
| 6,574,033 | B1 | 6/2003 | Chui et al. |
| 6,589,625 | B1 | 7/2003 | Kothari et al. |
| 6,593,934 | B1 | 7/2003 | Liaw et al. |
| 6,600,201 | B2 | 7/2003 | Hartwell et al. |
| 6,606,175 | B1 | 8/2003 | Sampsell et al. |
| 6,625,047 | B2 | 9/2003 | Coleman, Jr. |
| 6,630,786 | B2 | 10/2003 | Cummings et al. |
| 6,632,698 | B2 | 10/2003 | Ives |
| 6,636,187 | B2 | 10/2003 | Tajima et al. |
| 6,643,069 | B2 | 11/2003 | Dewald |
| 6,650,455 | B2 | 11/2003 | Miles |
| 6,666,561 | B1 | 12/2003 | Blakley |
| 6,674,090 | B1 | 1/2004 | Chua et al. |
| 6,674,562 | B1 | 1/2004 | Miles |
| 6,680,792 | B2 | 1/2004 | Miles |
| 6,710,908 | B2 | 3/2004 | Miles et al. |
| 6,713,695 | B2 * | 3/2004 | Kawai et al. ................ 200/181 |
| 6,741,377 | B2 | 5/2004 | Miles |
| 6,741,384 | B1 | 5/2004 | Martin et al. |
| 6,741,503 | B1 | 5/2004 | Farris et al. |
| 6,747,785 | B2 | 6/2004 | Chen et al. |
| 6,762,873 | B1 | 7/2004 | Coker et al. |
| 6,775,174 | B2 | 8/2004 | Huffman et al. |
| 6,778,155 | B2 | 8/2004 | Doherty et al. |
| 6,781,643 | B1 | 8/2004 | Watanabe et al. |
| 6,787,384 | B2 | 9/2004 | Okumura |
| 6,787,438 | B1 | 9/2004 | Nelson |
| 6,788,520 | B1 | 9/2004 | Behin et al. |
| 6,794,119 | B2 | 9/2004 | Miles |
| 6,811,267 | B1 | 11/2004 | Allen et al. |
| 6,813,060 | B1 | 11/2004 | Garcia et al. |
| 6,819,469 | B1 | 11/2004 | Koba |
| 6,822,628 | B2 | 11/2004 | Dunphy et al. |
| 6,829,132 | B2 | 12/2004 | Martin et al. |
| 6,853,129 | B1 | 2/2005 | Cummings et al. |
| 6,855,610 | B2 | 2/2005 | Tung et al. |
| 6,859,218 | B1 | 2/2005 | Luman et al. |
| 6,861,277 | B1 | 3/2005 | Monroe et al. |
| 6,862,022 | B2 | 3/2005 | Slupe |
| 6,862,029 | B1 | 3/2005 | D'Souza et al. |
| 6,867,896 | B2 | 3/2005 | Miles |
| 6,870,581 | B2 | 3/2005 | Li et al. |
| 6,903,860 | B2 | 6/2005 | Ishii |
| 7,034,783 | B2 | 4/2006 | Gates et al. |
| 7,123,216 | B1 | 10/2006 | Miles |
| 7,161,728 | B2 | 1/2007 | Sampsell et al. |

| | | | |
|---|---|---|---|
| 7,190,337 | B2 | 3/2007 | Miller et al. |
| 2001/0003487 | A1 | 6/2001 | Miles |
| 2001/0034075 | A1 | 10/2001 | Shigeru |
| 2001/0043171 | A1 | 11/2001 | Van Gorkom et al. |
| 2001/0046081 | A1 | 11/2001 | Hayashi et al. |
| 2001/0051014 | A1 | 12/2001 | Behin et al. |
| 2002/0000959 | A1 | 1/2002 | Colgan et al. |
| 2002/0005827 | A1 | 1/2002 | Kobayashi |
| 2002/0012159 | A1 | 1/2002 | Tew |
| 2002/0015215 | A1 * | 2/2002 | Miles ........................ 359/290 |
| 2002/0024711 | A1 | 2/2002 | Miles |
| 2002/0036304 | A1 | 3/2002 | Ehmke et al. |
| 2002/0050882 | A1 | 5/2002 | Hyman et al. |
| 2002/0054424 | A1 | 5/2002 | Miles et al. |
| 2002/0075226 | A1 | 6/2002 | Lippincott |
| 2002/0075555 | A1 | 6/2002 | Miles |
| 2002/0093722 | A1 | 7/2002 | Chan et al. |
| 2002/0097133 | A1 | 7/2002 | Charvet et al. |
| 2002/0122032 | A1 | 9/2002 | Hector et al. |
| 2002/0126364 | A1 | 9/2002 | Miles |
| 2002/0179421 | A1 | 12/2002 | Williams et al. |
| 2002/0186108 | A1 | 12/2002 | Hallbjorner |
| 2003/0004272 | A1 | 1/2003 | Power |
| 2003/0043157 | A1 | 3/2003 | Miles |
| 2003/0072070 | A1 | 4/2003 | Miles |
| 2003/0122773 | A1 | 7/2003 | Washio et al. |
| 2003/0137215 | A1 | 7/2003 | Cabuz |
| 2003/0137521 | A1 | 7/2003 | Zehner et al. |
| 2003/0189536 | A1 | 10/2003 | Ruigt |
| 2003/0202264 | A1 | 10/2003 | Weber et al. |
| 2003/0202265 | A1 | 10/2003 | Reboa et al. |
| 2003/0202266 | A1 | 10/2003 | Ring et al. |
| 2004/0008396 | A1 | 1/2004 | Stappaerts |
| 2004/0022044 | A1 | 2/2004 | Yasuoka et al. |
| 2004/0027701 | A1 | 2/2004 | Ishikawa |
| 2004/0051929 | A1 | 3/2004 | Sampsell et al. |
| 2004/0058532 | A1 | 3/2004 | Miles et al. |
| 2004/0080807 | A1 | 4/2004 | Chen et al. |
| 2004/0145049 | A1 | 7/2004 | McKinnell et al. |
| 2004/0145553 | A1 | 7/2004 | Sala et al. |
| 2004/0147056 | A1 | 7/2004 | McKinnell et al. |
| 2004/0160143 | A1 | 8/2004 | Shreeve et al. |
| 2004/0174583 | A1 | 9/2004 | Chen et al. |
| 2004/0179281 | A1 | 9/2004 | Reboa |
| 2004/0207587 | A1 | 10/2004 | Chen et al. |
| 2004/0212026 | A1 | 10/2004 | Van Brocklin et al. |
| 2004/0217378 | A1 | 11/2004 | Martin et al. |
| 2004/0217919 | A1 | 11/2004 | Pichl et al. |
| 2004/0218251 | A1 | 11/2004 | Piehl et al. |
| 2004/0218334 | A1 | 11/2004 | Martin et al. |
| 2004/0218341 | A1 | 11/2004 | Martin et al. |
| 2004/0223204 | A1 | 11/2004 | Mao et al. |
| 2004/0227493 | A1 | 11/2004 | Van Brocklin et al. |
| 2004/0233151 | A1 | 11/2004 | Hector et al. |
| 2004/0240032 | A1 | 12/2004 | Miles |
| 2004/0240138 | A1 | 12/2004 | Martin et al. |
| 2004/0245588 | A1 | 12/2004 | Nikkel et al. |
| 2004/0263944 | A1 | 12/2004 | Miles et al. |
| 2005/0001797 | A1 | 1/2005 | Miller et al. |
| 2005/0001828 | A1 | 1/2005 | Martin et al. |
| 2005/0012577 | A1 | 1/2005 | Pillans et al. |
| 2005/0038950 | A1 | 2/2005 | Adelmann |
| 2005/0057442 | A1 | 3/2005 | Way |
| 2005/0068583 | A1 | 3/2005 | Gutkowski et al. |
| 2005/0069209 | A1 | 3/2005 | Damera-Venkata et al. |
| 2005/0116924 | A1 | 6/2005 | Sauvante et al. |
| 2005/0168431 | A1 | 8/2005 | Chui |
| 2005/0206991 | A1 | 9/2005 | Chui et al. |
| 2005/0264548 | A1 | 12/2005 | Okamura et al. |
| 2005/0286113 | A1 | 12/2005 | Miles |
| 2005/0286114 | A1 | 12/2005 | Miles |
| 2006/0044246 | A1 | 3/2006 | Mignard |
| 2006/0044298 | A1 | 3/2006 | Mignard et al. |

| | | | | |
|---|---|---|---|---|
| 2006/0044928 | A1 | 3/2006 | Chui et al. | |
| 2006/0057754 | A1 | 3/2006 | Cummings | |
| 2006/0066542 | A1 | 3/2006 | Chui | |
| 2006/0066559 | A1 | 3/2006 | Chui et al. | |
| 2006/0066560 | A1 | 3/2006 | Gally et al. | |
| 2006/0066561 | A1 | 3/2006 | Chui et al. | |
| 2006/0066594 | A1 | 3/2006 | Tyger | |
| 2006/0066597 | A1 | 3/2006 | Sampsell | |
| 2006/0066598 | A1 | 3/2006 | Floyd | |
| 2006/0066601 | A1 | 3/2006 | Kothari | |
| 2006/0066937 | A1 | 3/2006 | Chui | |
| 2006/0066938 | A1 | 3/2006 | Chui | |
| 2006/0067648 | A1 | 3/2006 | Chui et al. | |
| 2006/0067653 | A1 | 3/2006 | Gally et al. | |
| 2006/0077124 | A1 * | 4/2006 | Gally et al. | 345/32 |
| 2006/0077127 | A1 | 4/2006 | Sampsell et al. | |
| 2006/0077505 | A1 | 4/2006 | Chui et al. | |
| 2006/0077520 | A1 | 4/2006 | Chui et al. | |
| 2006/0103613 | A1 | 5/2006 | Chui | |
| 2007/0177247 | A1 * | 8/2007 | Miles | 359/291 |

FOREIGN PATENT DOCUMENTS

| | | | |
|---|---|---|---|
| EP | 0300754 | A2 | 1/1989 |
| EP | 0306308 | A2 | 3/1989 |
| EP | 0318050 | A | 5/1989 |
| EP | 0 417 523 | A | 3/1991 |
| EP | 0 467 048 | A | 1/1992 |
| EP | 0570906 | A | 11/1993 |
| EP | 0608056 | A1 | 7/1994 |
| EP | 0655725 | A1 | 5/1995 |
| EP | 0 667 548 | A1 | 8/1995 |
| EP | 0725380 | A1 | 8/1996 |
| EP | 0852371 | A1 | 7/1998 |
| EP | 0911794 | A1 | 4/1999 |
| EP | 1 017 038 | A | 7/2000 |
| EP | 1 146 533 | A | 10/2001 |
| EP | 1 239 448 | | 9/2002 |
| EP | 1 280 129 | | 1/2003 |
| EP | 1343190 | A | 9/2003 |
| EP | 1345197 | A | 9/2003 |
| EP | 1381023 | A | 1/2004 |
| EP | 1 414 011 | | 4/2004 |
| EP | 1473691 | A2 | 11/2004 |
| GB | 2401200 | A | 11/2004 |
| JP | 2004-29571 | | 1/2004 |
| WO | WO 95/30924 | | 11/1995 |
| WO | WO 97/17628 | | 5/1997 |
| WO | WO 99/52006 | A3 | 10/1999 |
| WO | WO 01/73937 | A | 10/2001 |
| WO | WO 02/089103 | | 11/2002 |
| WO | WO 03/007049 | A1 | 1/2003 |
| WO | WO 03/015071 | A2 | 2/2003 |
| WO | WO 03/044765 | A2 | 5/2003 |
| WO | WO 03/060940 | A | 7/2003 |
| WO | WO 03/069413 | A1 | 8/2003 |
| WO | WO 03/073151 | A1 | 9/2003 |
| WO | WO 03/079323 | A | 9/2003 |
| WO | WO 03/090199 | A1 | 10/2003 |
| WO | WO 2004/006003 | A1 | 1/2004 |
| WO | WO 2004/026757 | A2 | 4/2004 |
| WO | WO 2004/049034 | A1 | 6/2004 |
| WO | WO 2004/054088 | | 6/2004 |

OTHER PUBLICATIONS

Seeger et al., "Stabilization of Electrostatically Actuated Mechanical Devices", (1997) International Conference on Solid State Sensors and Actuators; vol. 2, pp. 1133-1136.

Bains, "Digital Paper Display Technology holds Promise for Portables", CommsDesign EE Times (2000).

Lieberman, "MEMS Display Looks to give PDAs Sharper Image" EE Times (2004).

Lieberman, "Microbridges at heart of new MEMS displays" EE Times (2004).

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

Office Action mailed Nov. 2, 2007 in U.S. Appl. No. 11/054,703.

IPRP for PCT/US05/029161 filed Aug. 16, 2005.

Chen et al., Low peak current driving scheme for passive matrix-OLED, SID International Symposium Digest of Technical Papers, May 2003, pp. 504-507.

Extended European Search Report dated Feb. 27, 2008 for App. No. 05255179.3.

Office Action mailed May 29, 2008 in U.S. Appl. No. 11/054,703.

Office Action dated Jul. 18, 2008 in Chinese App. No. 200580027721.0.

Office Action received Nov. 30, 2007 in Chinese App. No. 200510093576.8.

* cited by examiner

| Row Output Signals | | Column Output Signals: $+V_{bias}$ | Column Output Signals: $-V_{bias}$ |
|---|---|---|---|
| | 0 | Stable | Stable |
| | $+\Delta V$ | Relax | Actuate |
| | $-\Delta V$ | Actuate | Relax |

CURRENT MODE DISPLAY DRIVER CIRCUIT REALIZATION FEATURE

RELATED APPLICATIONS

This application claims the benefit of U.S. Provisional Application No. 60/604,893, filed Aug. 27, 2004, entitled "Current And Power Management In Modulator Arrays," which is incorporated herein by reference in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

A first embodiment includes a device for modulating light including at least one light modulator having a movable optical element positionable in two or more positions, said modulator operating interferometrically to exhibit a different predetermined optical response in each of the two or more positions, and control circuitry connected to said light modulator for controlling said interferometric modulator, wherein the control circuitry provides a substantially constant current to said light modulator to control said movable optical element.

In one aspect of the first embodiment, the control circuitry is controllably switchable between a first configuration of the control circuitry that provides no current to said at least one light modulator and a second configuration that provides current to the at least one light modulator, and wherein said control circuitry is configured to provide a current to said movable optical element when switched between the first configuration and the second configuration. In a second aspect of the first embodiment, the first circuit configuration includes a plurality of electrical devices connected electrically in a parallel configuration with each other, each of the electrical devices capable of storing an electric charge, and the second configuration includes the plurality of electrical devices configured such that they are connected electrically in a series configuration with each other, and such that the series configuration is connected to said at least one light modulator. In a third aspect of the first embodiment, the plurality of electrical devices includes capacitors. In a fourth aspect of the first embodiment, the plurality of electrical devices includes three or more capacitors. In a fifth aspect of the first embodiment, the plurality of electrical devices includes seven or more capacitors. In a sixth aspect of the first embodiment, the plurality of electrical devices includes ten or more capacitors. In a seventh aspect of the first embodiment, the control circuitry is configured to switch between the first configuration and the second configuration by connecting each electrical device from an electrically parallel configuration with each other to an electrically series configuration with said light modulator over a predetermined time period. In an eighth aspect of the first embodiment, the plurality of electrical devices comprise capacitors. In a ninth aspect of the first embodiment, the control circuitry is further configured to switch between the second configuration and the first configuration by connecting each of the plurality of electrical devices from an electrically series configuration with said light modulator to an electrically parallel configuration with each other over a predetermined time period. In a tenth aspect of the first embodiment, the plurality of electrical devices comprise capacitors.

A second embodiment includes a method of driving an interferometric modulator pixel with a driving circuit, the method including providing a potential difference across the interferometric pixel, wherein the provided potential difference increases over a period of time, and changing the position of a movable reflective layer of the interferometric pixel based on the provided potential difference, wherein providing a potential difference across the interferometric pixel includes incrementally increasing the potential difference across the interferometric pixel by a predetermined amount, wherein the potential difference is increased in two or more increments.

A first aspect of the second embodiment includes receiving a signal in a driving circuit indicating to actuate an interferometric modulator pixel. In a second aspect of the second embodiment, providing a potential difference across the interferometric pixel includes incrementally increasing the potential difference across the interferometric pixel by a predetermined amount, wherein the potential difference is increased in five or more increments. In a third aspect of the second embodiment, providing a potential difference across the interferometric pixel includes incrementally increasing the potential difference across the interferometric pixel by a predetermined amount, wherein the potential difference is increased in five or more increments.

A third embodiment includes a method of driving an interferometric modulator pixel with a substantially constant current source to produce different optical responses, the method including configuring a drive circuit in a first state so that a plurality of charge storing devices are charged by a voltage source and the plurality of charge storing devices do not provide a voltage across the interferometric modulator pixel, changing the configuration of the driving circuit to a second state in a series of incremental steps over a predetermined time, wherein each of the incremental steps includes connecting one of the plurality of charge storing devices to the pixel such that it provides a voltage across the pixel. In a first aspect of the third embodiment, the plurality of charge storing devices includes one or more capacitors.

A fourth embodiment includes a method of driving an interferometric modulator pixel with a substantially constant current source to produce different optical responses, the method including providing a substantially constant current source to drive the interferometric modulator pixel, said providing including connecting one of a plurality of charge storing devices in the driving circuit to provide a potential difference across the interferometric modulator pixel, and repeating said switching step until all of the plurality of charge storing devices are connected in an electrical series connection with each other, and such that the plurality of charge storing devices provide a potential difference across the interferometric modulator pixel.

In a first aspect of the fourth embodiment, providing a substantially constant current source to drive the interferometric modulator pixel further includes configuring one of the plurality of charge storing devices in the driving circuit so that it does not provide a potential difference across the interferometric modulator pixel, and repeating said configuring step until all of the plurality of charge storing devices are configured so that they do not provide a potential difference across the interferometric modulator pixel. In a second aspect of the fourth embodiment, the plurality of charge storing devices includes one or more capacitors.

DETAILED DESCRIPTION OF CERTAIN EMBODIMENTS

Figure 1:
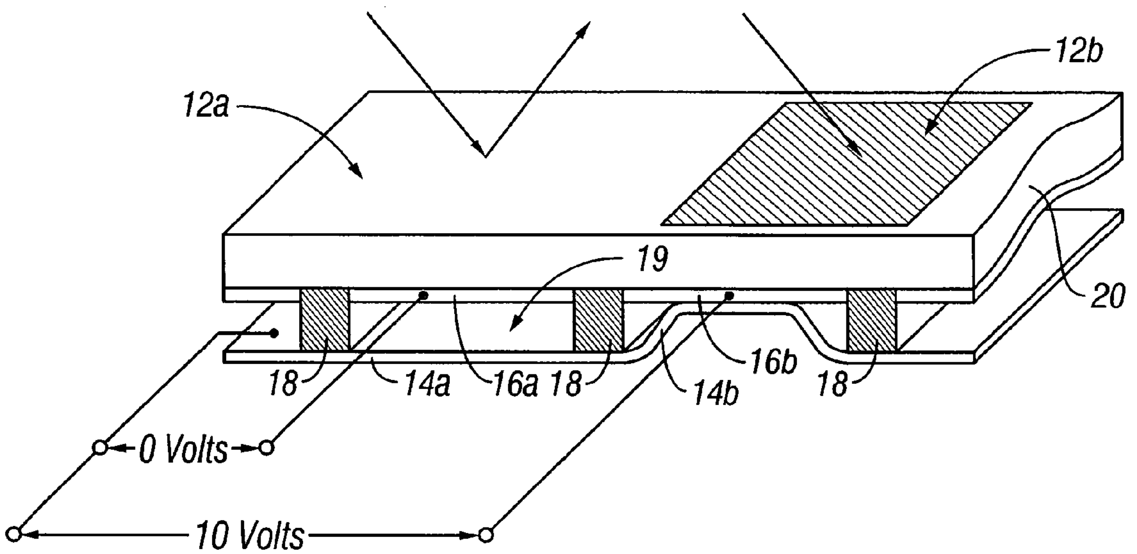
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

An interferometric MEMS display pixel includes parallel conductive plates that can move towards each other or away from each other to modulate reflected light. Typically one of the conductive plates is a movable reflective layer. A voltage is applied to an electrode of the MEMs pixel to deform the movable reflective layer from the released state to the actuated state, or from the actuated state to the released state. If the voltage applied to a MEMs pixel is changed quickly, a large current flows. This current is partially wasted as heat due to the resistance of the electrode wire. Configurations of drive circuits generating large instantaneous current flows typically require large and expensive capacitors to provide the required current which can increase overall cost of the modulator device. If the voltage applied to the MEMs pixel is increased over a period of time (e.g., ramped) rather than being instantaneously applied, the voltage produces a constant or substantially constant current flow to charge the MEMs pixel. Such a configuration can reduce the peak current through the drive circuit and reduce the total power required to charge a pixel to the desired release or actuated state. In one embodiment, the increasing voltage is produced by sequentially connecting two or more capacitors in the drive circuit to the MEMs pixel such that the addition of each capacitor adds a small incremental voltage across the MEMs pixel and correspondingly produces an incremental current flow to the MEMs pixel. Connecting two or more capacitors over a period of time can provide a substantially constant current flow to charge the MEMs pixel.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12*a* and 12*b*. In the interferometric modulator 12*a* on the left, a movable reflective layer 14*a* is illustrated in a relaxed position at a predetermined distance from an optical stack 16*a*, which includes a partially reflective layer. In the interferometric modulator 12*b* on the right, the movable reflective layer 14*b* is illustrated in an actuated position adjacent to the optical stack 16*b*.

The optical stacks 16*a* and 16*b* (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14*a*, 14*b* may be formed as a series of parallel strips of a deposited metal layer or layers (orthogonal to the row electrodes of 16*a*, 16*b*) deposited on top of posts 18 and an intervening sacrificial material deposited between the posts 18. When the sacrificial material is etched away, the movable reflective layers 14*a*, 14*b* are separated from the optical stacks 16*a*, 16*b* by a defined gap 19. A highly conductive and reflective material such as aluminum may be used for the reflective layers 14, and these strips may form column electrodes in a display device.

With no applied voltage, the cavity 19 remains between the movable reflective layer 14*a* and optical stack 16*a*, with the movable reflective layer 14*a* in a mechanically relaxed state, as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
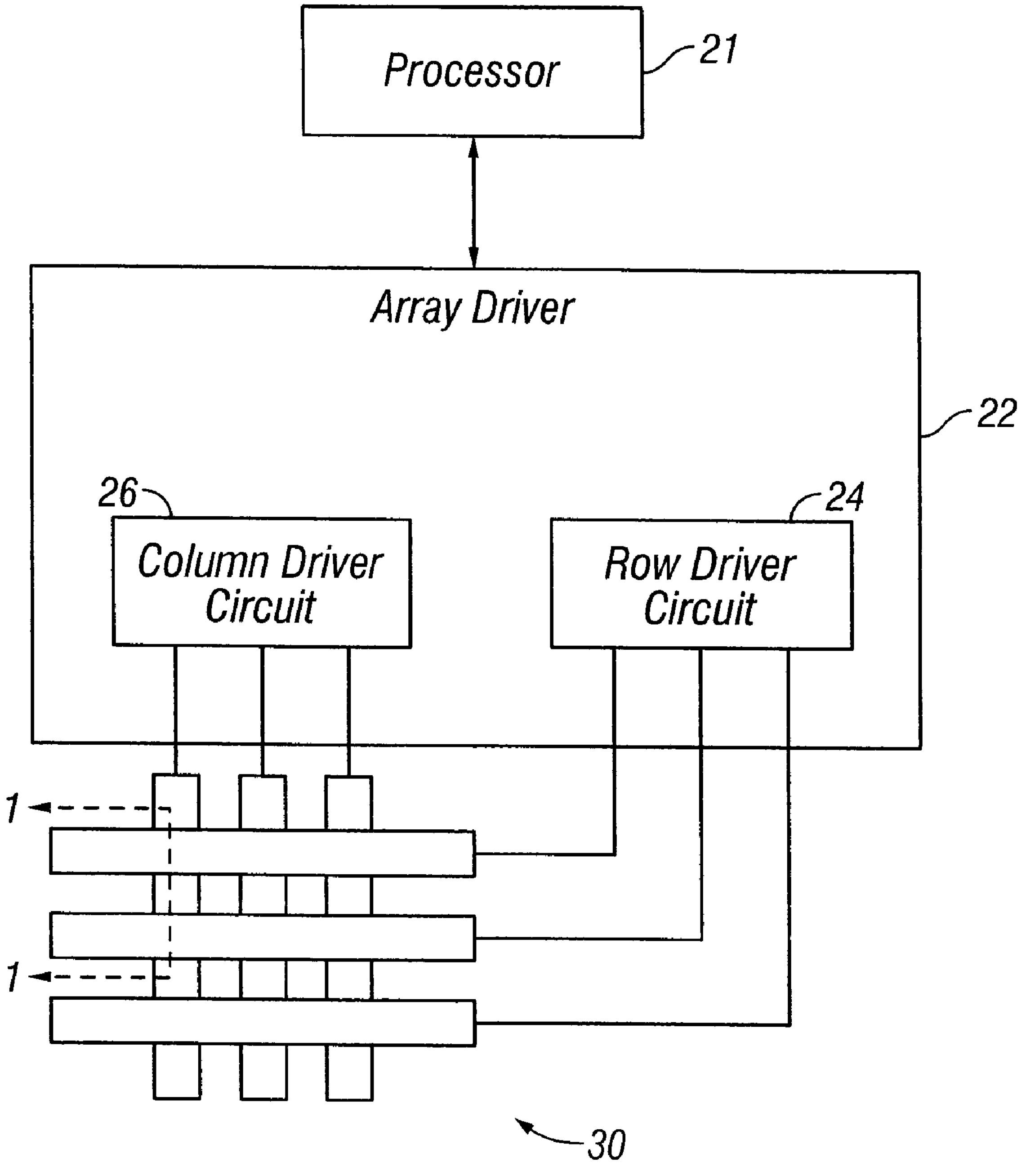
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
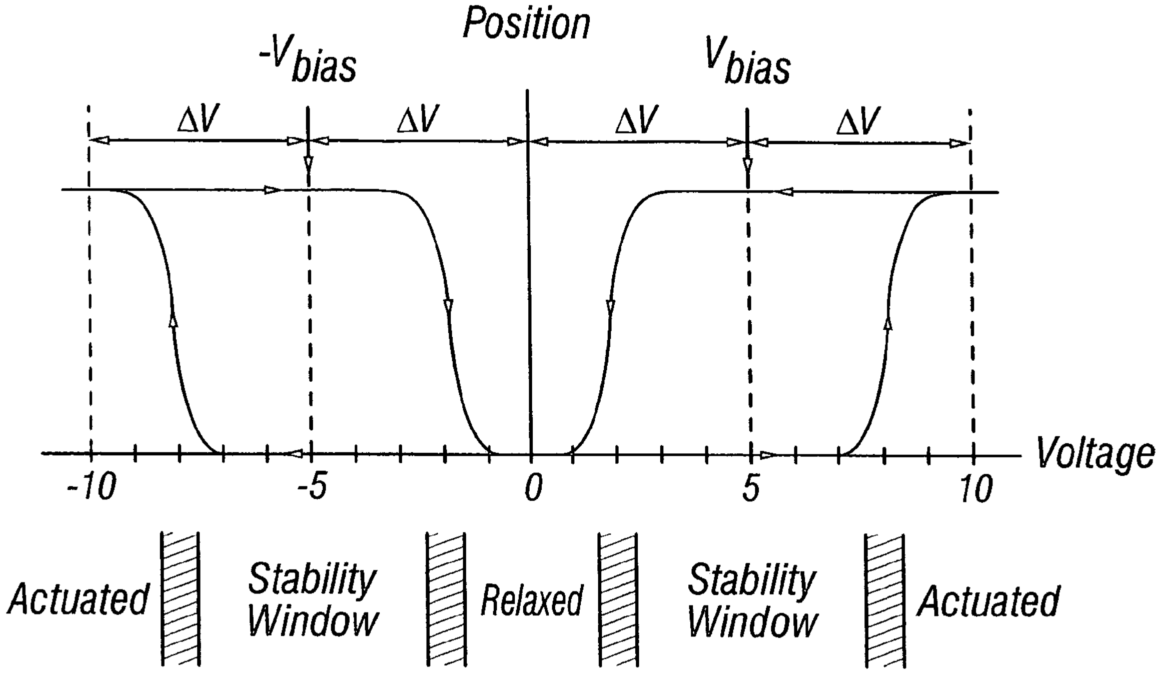
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
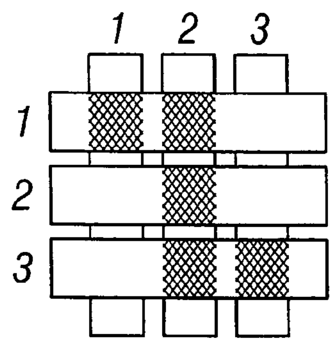
FIG. 5A illustrates one exemplary frame of display data in the 3×3 interferometric modulator display of FIG. 2.
Figure 5B:
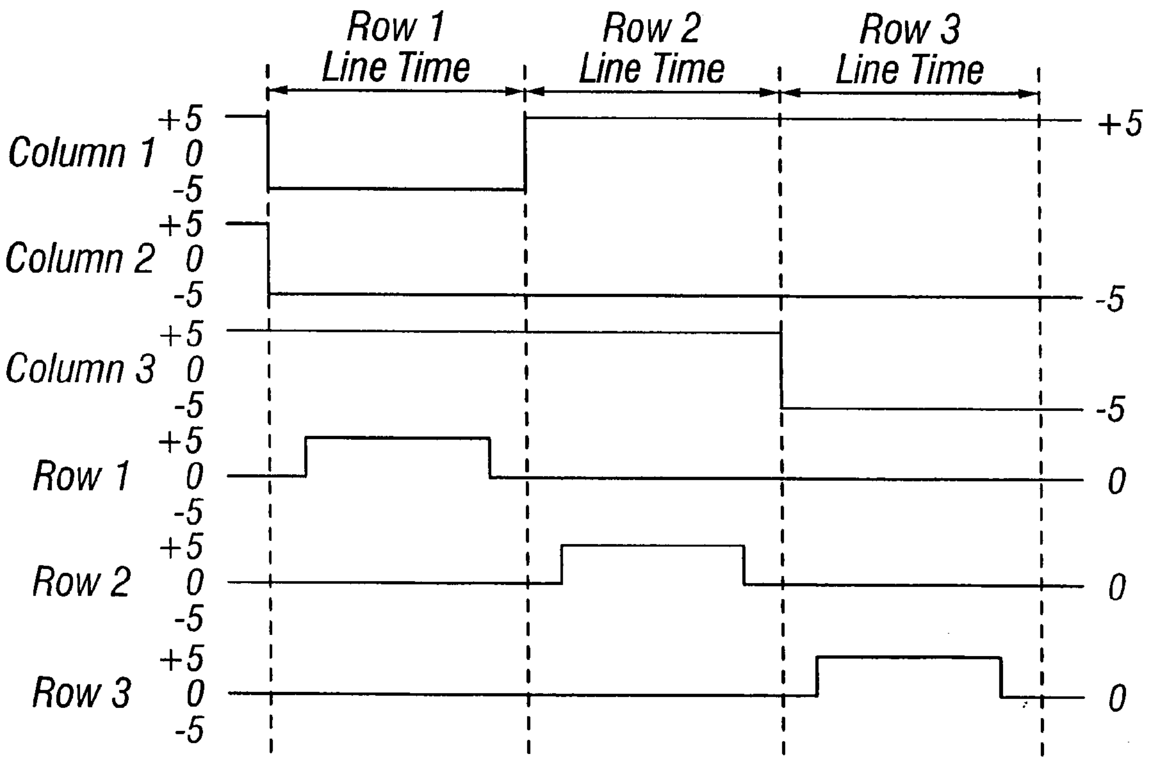
FIG. 5B illustrates one exemplary timing diagram for row and column signals that may be used to write the frame of FIG. 5A.

FIGS. 4, 5A and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
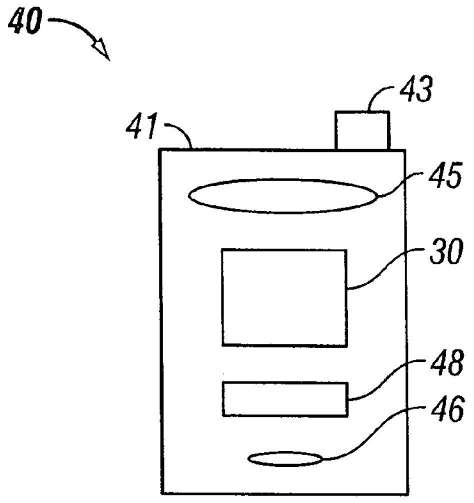
FIGS. 6A and 6B are system block diagrams illustrating an embodiment of a visual display device comprising a plurality of interferometric modulators.
Figure 6B:
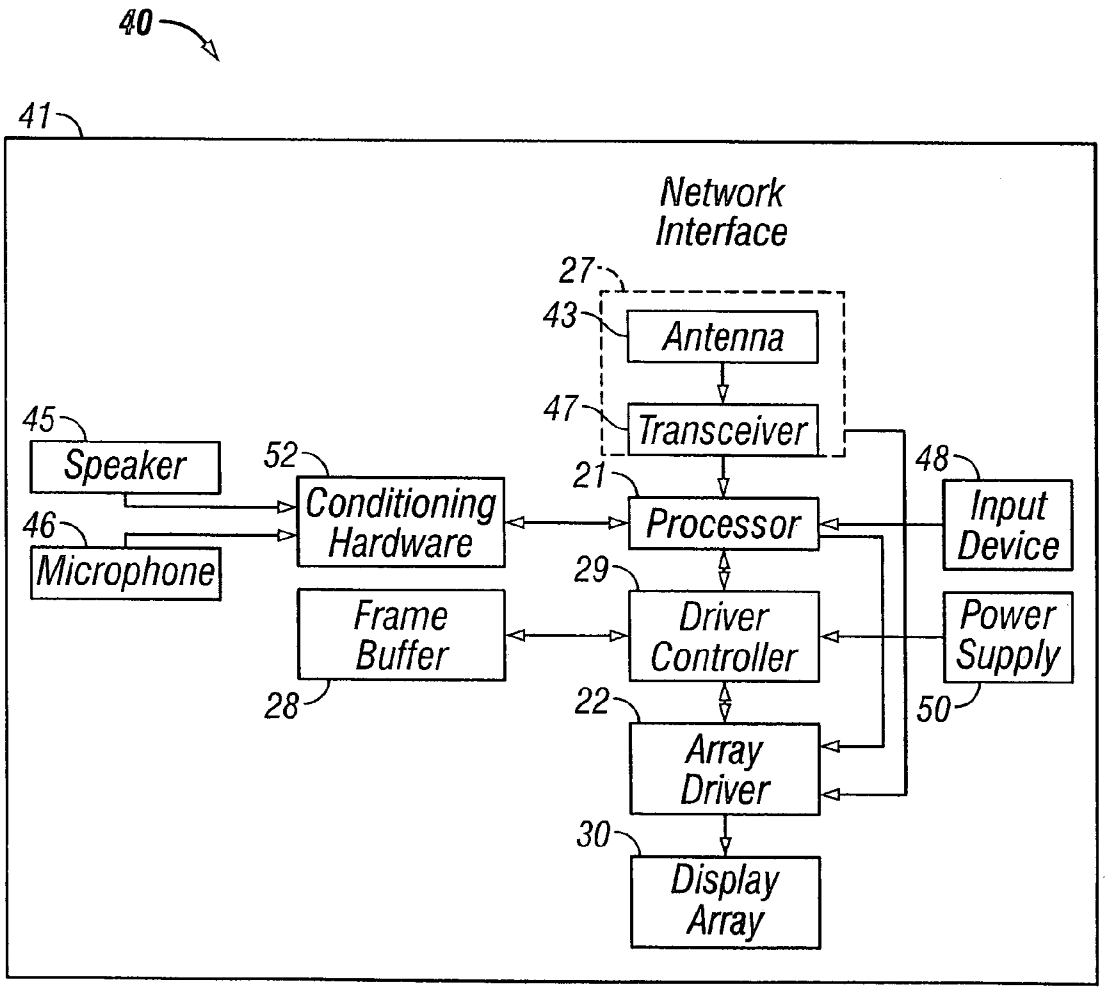

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
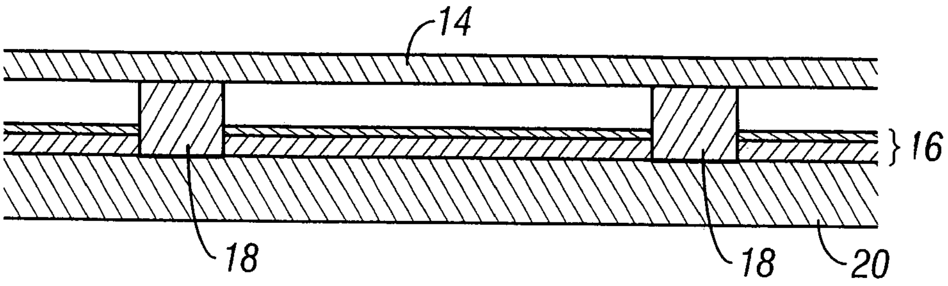
FIG. 7A is a cross section of the device of FIG. 1.
Figure 7B:
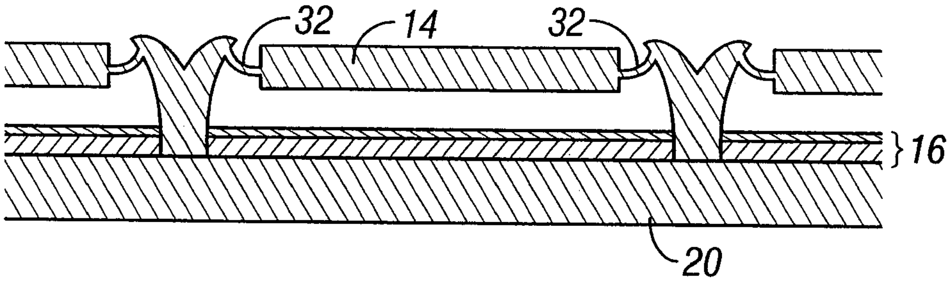
FIG. 7B is a cross section of an alternative embodiment of an interferometric modulator.
Figure 7C:
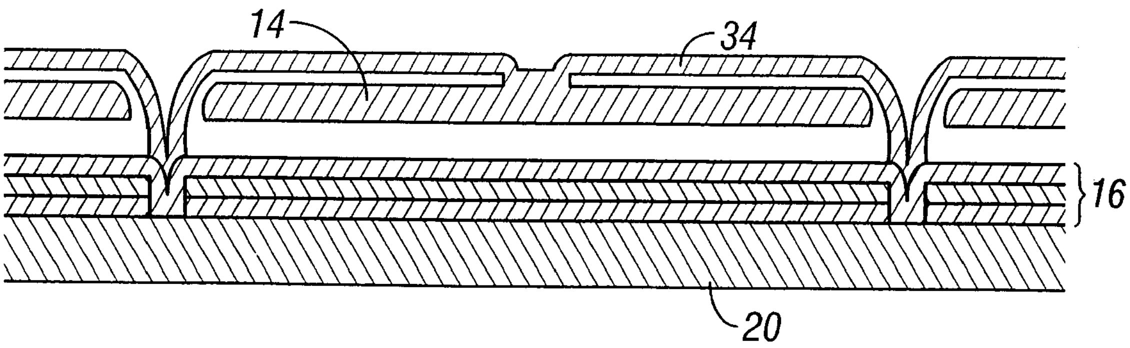
FIG. 7C is a cross section of another alternative embodiment of an interferometric modulator.
Figure 7D:
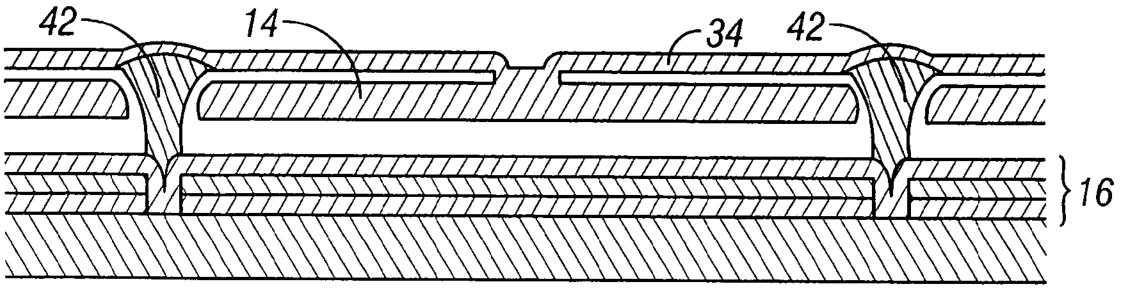
FIG. 7D is a cross section of yet another alternative embodiment of an interferometric modulator.
Figure 7E:
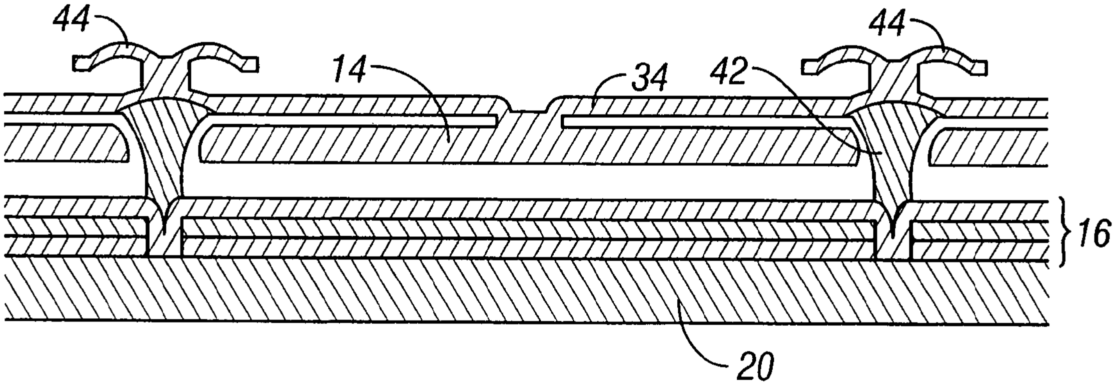
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIGS. 7A-7E, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
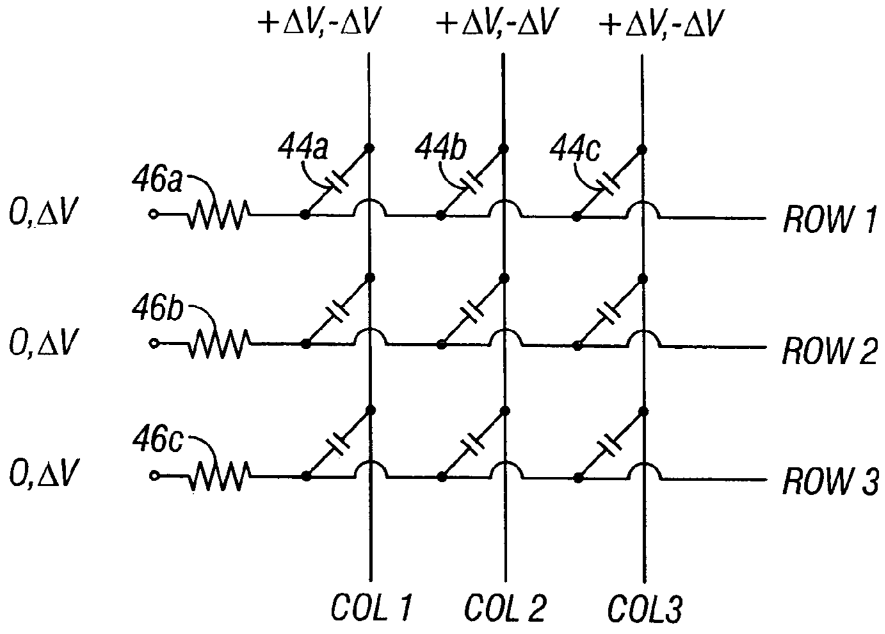
FIG. 8 is a schematic illustrating an embodiment of the pixel array shown in FIG. 1.

FIG. 8 is a schematic illustrating further details of an embodiment of the 3×3 pixel array 30 shown in FIG. 2. In the embodiment illustrated in FIG. 8, Row 1 electrode includes a resistor 46*a* connected to interferometric modulator pixels 44*a-c* which are connected to the electrodes for columns 1-3, respectively. Rows 2 and 3 are similarly configured. To actuate or release the interferometric pixels 44*a-c*, an appropriate voltage (e.g., +ΔV or −ΔV) is asserted on the set of column electrodes, and then row 1 is strobed with a ΔV pulse. As discussed above in relation to FIG. 5A, the pulse on the row electrode actuates or releases the pixels 44*a-c* when the voltage difference on the pixels 44*a-c* exceeds the stability window (FIG. 5A).

Figure 9A:
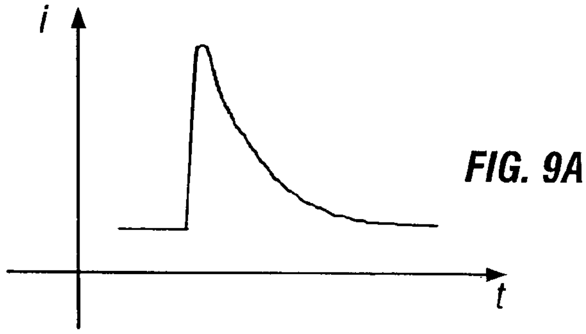
FIG. 9A is a graph illustrating an example of a current flow resulting from quickly changing the voltage on an electrode of an interferometric modulator pixel.
Figure 9B:
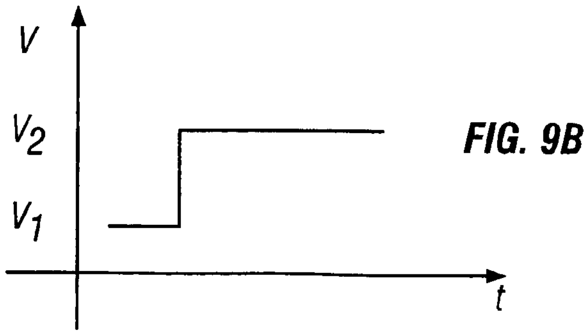
FIG. 9B is a graph illustrating the change in voltage in a drive circuit that results in the current flow illustrated in FIG. 9A.

FIGS. 9A and 9B are graphs illustrating an example of a current flow that occurs in one embodiment of a drive circuit over time t when changing the voltage applied to a pixel or a row of pixels, for example, a drive circuit that can be in the array driver 22 for MEMs pixel 12*a* (FIG. 1). A voltage change applied to the MEMs pixel changes the charge on the row capacitance. If the voltage applied to an electrode of a pixel row is changed quickly at time $t_1$ as illustrated in FIG. 9B, a large instantaneous current flows, as illustrated in FIG. 9A. This current is partially wasted as heat due to the resistance of the electrode wire. Configurations of drive circuits generating large instantaneous current flows typically require large and expensive capacitors to provide the required current, which contribute to the overall cost of the light modulating device.

Figure 10A:
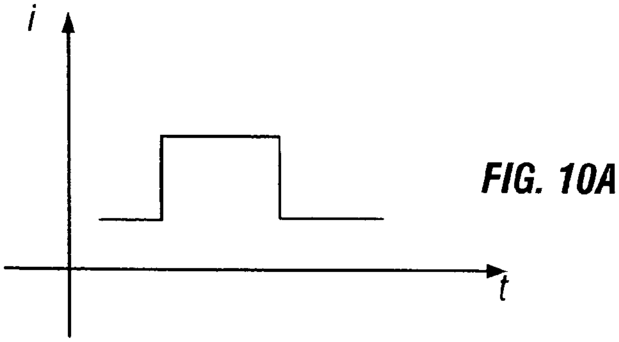
FIG. 10A is a graph illustrating a constant current flow in a drive circuit of an interferometric modulator pixel.
Figure 10B:
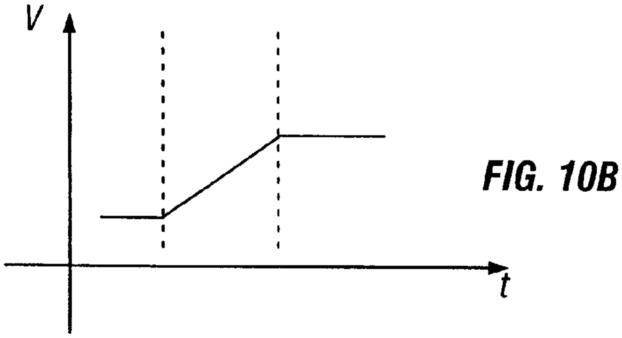
FIG. 10B is a graph illustrating the change in voltage in a drive circuit that results in the constant current flow shown in FIG. 10A.
Figure 11:
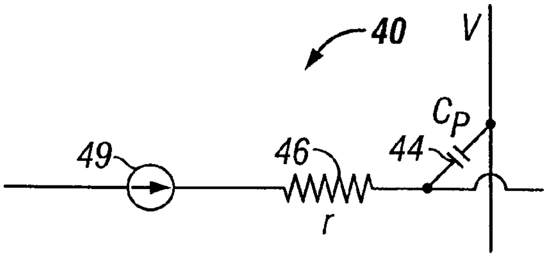
FIG. 11 is a schematic illustrating an interferometric modulator pixel drive circuit with a constant current source.

As an alternative to generating a large current, a constant current flow, or a current flow that is at least substantially constant, can be used to provide the current to charge and/or discharge the MEMs pixel(s). To generate the constant current flow, the voltage applied to a MEMs pixel is incrementally changed over a period of time, so that the voltage is constantly ramped up to the desired voltage level. FIG. 10A is a graph illustrating a constant current flow in a drive circuit of a MEMs pixel, during the period from time $t_1$ to time $t_2$, that can be used to charge the MEMs pixel capacitance. The corresponding voltage that produces the constant current flow shown in FIG. 10A is illustrated in FIG. 10B. Using a constant current flow to charge the MEMs pixel capacitance can reduce the peak current through the drive circuit and also reduce the total power required to charge a pixel to the desired release or actuated state. Although producing a constant current flow may be preferred, a drive circuit configured to produce a substantially constant current flow also reduces the power requirements of the drive circuit. As used herein, "substantially constant current flow" means current flow that is lower in maximum amplitude and is spread over a longer time period than would occur with a decaying current spike characteristic of a single step application of a final desired voltage FIG. 11 is a schematic of one embodiment of a portion of an interferometric modulator pixel drive circuit 40 that uses a constant current flow to charge a MEMs pixel capacitance. The drive circuit includes a constant current source 49 electrically connected to the capacitive interferometric modulator pixel ($C_p$) 44. A resistor 46 is shown in FIG. 11 to exemplify the resistance of the row electrode. Although FIG. 11 illustrates a drive circuit 40 used for a MEMs interferometric modulator, a similar MEMs drive circuit having a constant current source can also be used to control other MEMs devices, for example, MEMs motors, switches, variable capacitors, sensors, and/or fluid valves.

Figure 12:
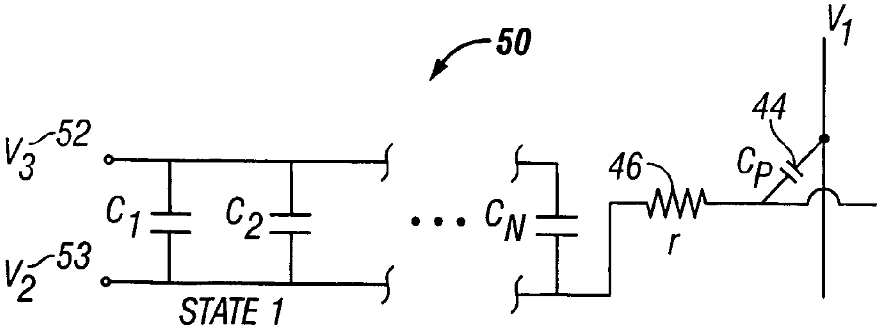
FIG. 12 is a schematic of an embodiment of a drive circuit for a interferometric modulator pixel having a plurality of capacitive devices configured in a first state.
Figure 13:
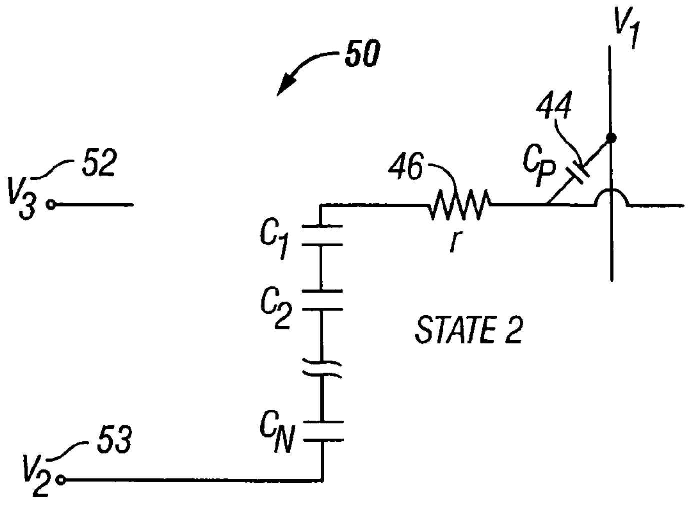
FIG. 13 is a schematic of an embodiment of a drive circuit for a interferometric modulator pixel having a plurality of capacitive devices configured in a second state.

FIGS. 12 and 13 illustrate an embodiment of a drive circuit 50 that provides a ramped voltage in a series of discrete steps and produces a substantially constant current flow to charge the capacitive interferometric modulator pixel ($C_p$) 44 to the desired level. The drive circuit 50 is configurable to achieve two different configurations or states, where an example of state 1 of the drive circuit 50 is shown in FIG. 12, and an example of state 2 of the drive circuit 50 is shown in FIG. 13. In one embodiment, the configuration of the drive circuit 50 changes between state 1 and state 2 in a series of steps, as described below.

Again referring to FIGS. 12 and 13, the configuration of the drive circuit 50 is changed from state 1 to state 2, or from state 2 to state 1, by changing the connections of a plurality of charged devices over a relatively short period of time (e.g., milliseconds or less) to provide a ramping (e.g., increasing or decreasing) potential difference across the pixel 44. Changing the connections of the plurality of charge devices can be done in a series of two of more steps. Connecting an additional charge device provides an incremental increase in the potential difference across the pixel 44, and when multiple charge devices are connected in a series over a relatively short period of time, the charge devices provide a ramped voltage that produces a substantially constant current flow in the drive circuit 50 and saves power by avoiding a current spike. If used in the drive scheme of FIGS. 3-5, exemplary voltages are $V_1$=±5 depending on the data state for the pixel, $V_2$=O and $V_3$=1−5 volts.

The drive circuit 50 shown in FIG. 12 includes a voltage source $V_3$ 52 and a plurality of charge devices, e.g., capacitors $C_1$-$C_N$, electrically connected across voltage source $V_2$ and $V_3$ 52. The voltage source $V_3$ 52 provides a potential difference to charge the plurality of capacitors. The drive circuit 50 also illustrates the interferometric pixel 44 that can be configured separately or in a row of pixels, and a resistance 46. The drive circuit 50 configured in state 1 (e.g., FIG. 12) illustrates a configuration of the plurality of capacitors electrically connected in across the voltage sources $V_3$ 52 and $V_2$ 53. In state 1 (FIG. 12) the plurality of capacitors are not connected to provide a potential difference across the interferometric pixel 44. Changing the configuration of the drive circuit 50 from state 1 (FIG. 12) to state 2 (FIG. 13) comprises configuring the connections of the plurality of capacitors $C_1$-$C_N$ so that two or more of the plurality of capacitors are connected to charge or discharge pixels of the row. This is discussed further with respect to FIGS. 15-18.

If a voltage $-\Delta V$ is asserted at voltage source $V_1$ the interferometric pixel 44 can be actuated by strobing a $+\Delta V$ pulse on the row electrode of the drive circuit 50 which can be done by configuring the drive circuit 50 to state 2 (FIG. 13). Alternatively, if a voltage $+\Delta V$ is asserted at voltage source $V_1$ the interferometric pixel 44 can be released (e.g., relaxed) by strobing a $+\Delta V$ pulse on the row electrode of the drive circuit 50 which can also be done by configuring the drive circuit 50 to state 2. The voltage provided to the interferometric pixel 44 on the row electrode can be reduced by reversing the configuration of one or more of the capacitors $C_1$-$C_N$ so that they do not provide a potential difference across the interferometric pixel 44. To reduce the voltage, one or more of the plurality of capacitors $C_1$-$C_N$ connected to change the potential difference across the interferometric pixel 44 in state 2 can be removed in reverse order from their original placement such that they no longer provide a potential difference across the interferometric pixel 44, and are instead connected in the configuration illustrated in FIG. 12. If the configuration of one or more of the capacitors $C_1$-$C_N$ is changed such that the drive circuit 50 is in an intermediate state between state 1 and state 2 or in state 2, or when the drive circuit 50 is in state 1, the interferometric pixel 44 remains in its current state due to hysteresis, as discussed above and illustrated in FIG. 3.

Figure 14A:
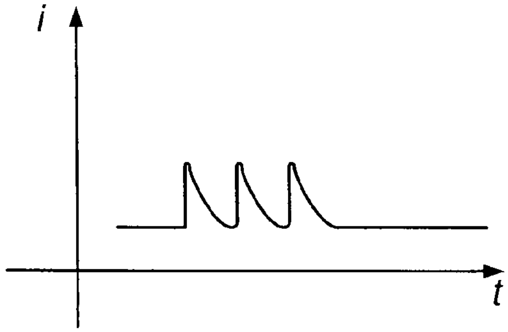
FIG. 14A is a graph illustrating a current flow in a drive circuit of an interferometric modulator pixel.
Figure 14B:
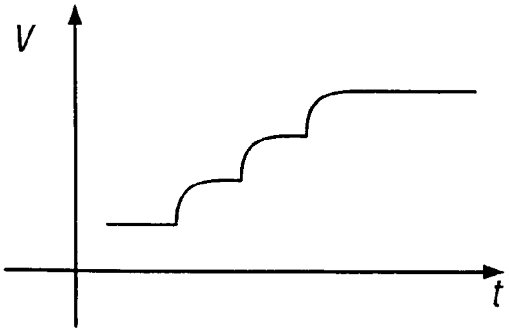
FIG. 14B is a graph illustrating the change in voltage in a drive circuit that results in the current flow shown in FIG. 14A.

FIG. 14A is a graph illustrating an example of a current flow in a drive circuit of an interferometric modulator pixel when a series of several capacitors are connected to change the configuration of the drive circuit from state 1, as discussed above in reference to FIG. 12, to the configuration of state 2, as discussed above in reference to FIG. 13. FIG. 14B is a graph illustrating the change in voltage that occurs when connecting the capacitors causing the corresponding current flow shown in FIG. 14A. Connecting each capacitor increases the voltage, as shown in FIG. 14B, which results in a corresponding increase in current flow. When the capacitors are sequentially connected over a relatively short time period, the current flow becomes substantially constant and the power requirements of the circuit can be diminished. Changing the configuration of the driving circuit from state 2 back to state 1 reduces the voltage on the row back to $V_2$ 52.

Figure 15:
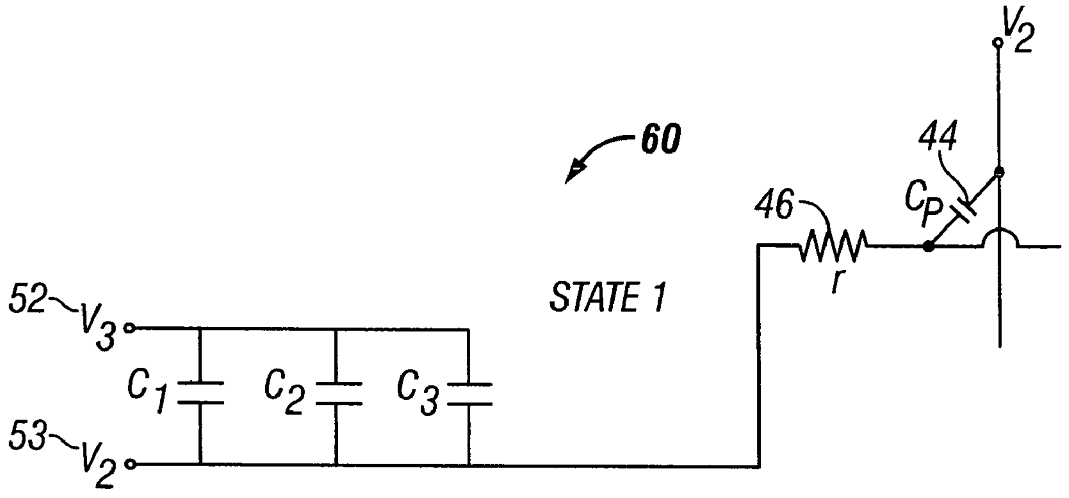
FIG. 15 is a schematic of one embodiment of a constant current drive circuit that includes three capacitors configured in a first state.

FIG. 15 is a schematic of the constant current drive circuit 60 that includes similar electrical elements in a similar configuration as the drive circuit 50 shown in FIG. 12. The capacitors in FIG. 15 are configured so that they are in an electrically parallel configuration across voltage source $V_2$ 52 and voltage source $V_3$ 53, and do not provide a potential difference across the interferometric pixel 44.

Figure 16:
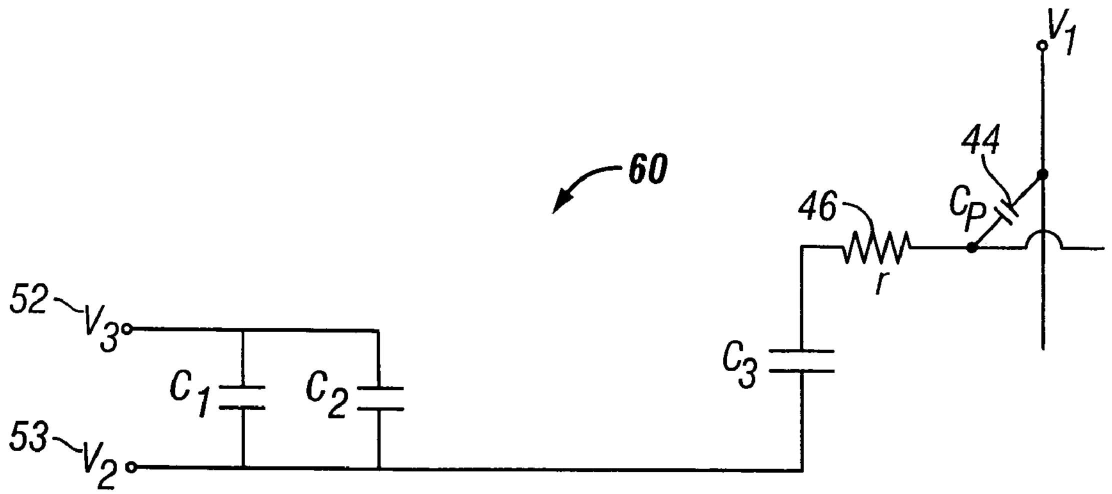
FIG. 16 is a schematic of the constant current drive circuit shown in FIG. 15 illustrating an intermediate configuration between a first state and a second state.

FIG. 16 is a schematic of the drive circuit 60 shown in FIG. 13 illustrating an intermediate configuration between state 1 and state 2. In FIG. 15, the capacitor $C_3$ is now connected to the row electrode such that $C_3$ provides a potential difference across the pixel 44. The configuration of capacitors $C_1$ and $C_2$ remains the same. The effect of changing the configuration of $C_3$ is that a relatively small incremental increase in voltage is applied across the pixel 44, causing a small current flow to charge or discharge the pixel 44.

Figure 17:
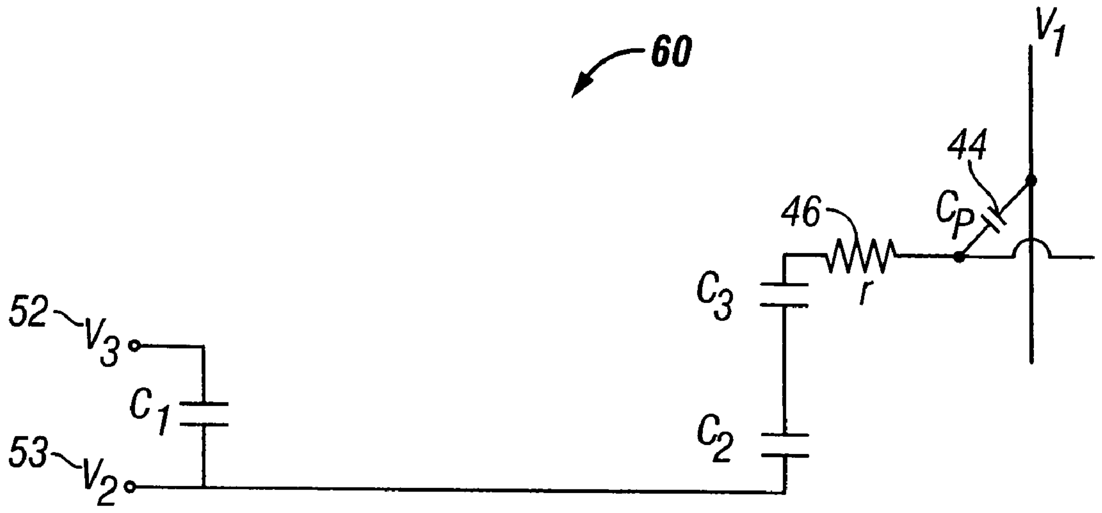
FIG. 17 is a schematic of the constant current drive circuit shown in FIG. 15 illustrating an intermediate configuration between a first state and a second state.

In FIG. 17 is a schematic of the constant current drive circuit 60 shown in FIG. 15 illustrating another intermediate configuration between a state 1 and state 2. In FIG. 17, capacitor $C_2$ is connected in series with $C_3$ so that both $C_3$ and $C_2$ provide a potential difference across the pixel 44. Connecting $C_2$ provides a second incremental increase in voltage applied across the pixel 44. When $C_3$ and $C_2$ are sequentially connected to provide voltage across the pixel 44 during a short period of time, the sequential increase in voltage can produce a substantially constant current in the circuit containing the pixel 44.

Figure 18:
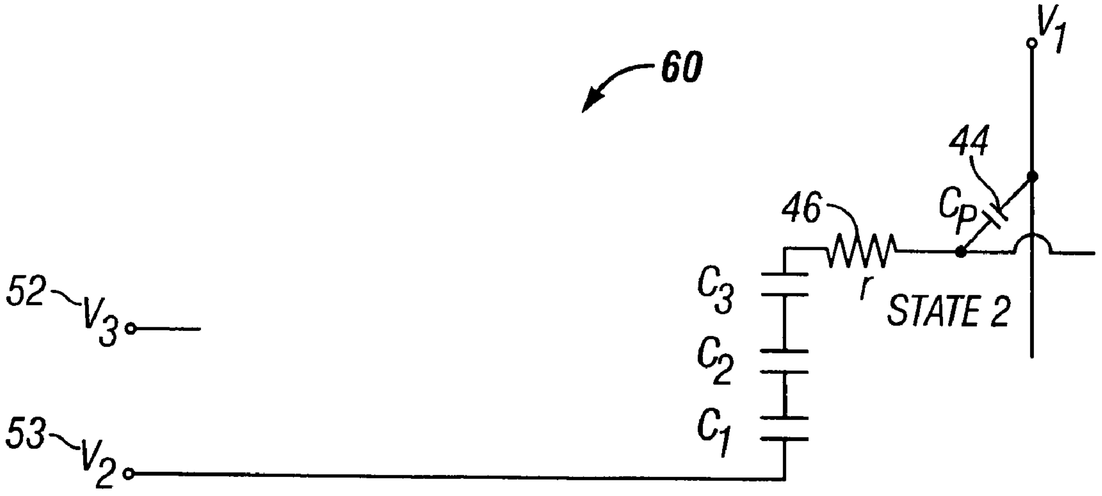
FIG. 18 is a schematic of the constant current drive circuit shown in FIG. 15 configured in a second state.

FIG. 18 is a schematic of the constant current drive circuit 60 shown in FIG. 15 configured in state 2. In FIG. 18, capacitor $C_1$ is connected in series with $C_3$ and $C_2$ so that both $C_3$, $C_2$, and $C_1$ provide a potential difference across the pixel 44. Connecting $C_1$ provides a third incremental increase in voltage applied across pixel 44, and causes an increase in current to charge the pixel 44. When $C_3$, $C_2$, and $C_1$ are sequentially connected to provide voltage across the pixel 44 during a short period of time, the sequential increase in voltage produces a substantially constant current in the circuit containing the pixel 44.

FIGS. 15-18 illustrate an embodiment of a drive circuit that uses three capacitors (charge devices) to provide constant current, or a substantially constant current, in the form of a series of small current pulses to actuate or release the pixel 44. Other embodiments of a drive circuit that provides a constant current can include two capacitors in a "capacitor ladder," or more than two capacitors. For example, in some embodiments the drive circuit can include five capacitors, and in other embodiments the drive circuit can include ten or more capacitors in the capacitor ladder.

In embodiments having a single pixel, or in embodiments where singly addressable pixels are arranged in an array of two or more pixels, the movable reflective layer 14 (FIG. 1) can be positioned in the cavity 19 at intermediate positions from the electrode layer 16 by adjusting the charge on the pixel through adding or removing charge devices, as described in reference to FIGS. 12 and 13. A typical interferometric modulator, for example, the interferometric modulator described in FIG. 1, has two states, an actuated state and a relaxed or released state. The interferometric modulator described here having more than two states is referred to herein as an "analog" modulator. To individually address a pixel to operate it in analog mode, the pixel can have a switch, for example, a MEMS switch or a transistor switch, so that the pixel can be individually actuated. The deflection of the movable reflective layer 14 changes the dimensions of the cavity 21 and causes light within the cavity to be modulated by interference, where each position results in a different interferometric effect. In such embodiments, sequentially adding one or more charge devices can provide a defined charge to a pixel so that the movable reflective layer of the pixel is accurately moved to the desired intermediate position to cause the desired interferometric effect.

While the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

The invention claimed is:

1. A device for modulating light, comprising:

at least one light modulator comprising a movable optical element positionable in two or more positions, said modulator operating interferometrically to exhibit a different predetermined optical response in each of the two or more positions; and control circuitry connected to said light modulator for controlling said interferometric modulator, wherein the control circuitry provides a substantially constant current to said light modulator to control said movable optical element, wherein said control circuitry is controllably switchable between a first configuration that provides no current to said at least one light modulator and a second configuration that provides current to the at least one light modulator, and wherein said control circuitry is configured to provide current to said movable optical element when switched from the first configuration to the second configuration, wherein the first circuit configuration comprises a plurality of electrical devices connected electrically in a parallel configuration with each other, each of the electrical devices configured to store an electric charge, wherein the second configuration comprises the plurality of electrical devices configured such that they are connected electrically in a series configuration with each other, and such tat the series configuration is connected to said at least one light modulator, and wherein said control circuitry is configured to switch between the first configuration and the second configuration by connecting electrically each of the plurality of electrical devices in a series configuration with said light modulator over a predetermined time period.

2. A device for modulating light, comprising:

at least one light modulator comprising a movable optical element positionable in two or more positions, said modulator operating interferometrically to exhibit a different predetermined optical response in each of the two or more positions; and control circuitry connected to said light modulator for controlling said interferometric modulator, wherein the control circuitry provides a substantially constant current to said light modulator to control said movable optical element, wherein said control circuitry is controllably switchable between a first configuration of the control circuitry that provides no current to said at least one light modulator and a second configuration that provides current to the at least one light modulator, and wherein said control circuitry is configured to provide a current to said movable optical element when switched between the first configuration and the second configuration, wherein the first circuit configuration comprises a plurality of electrical devices connected electrically in a parallel configuration with each other, each of the electrical devices configured to store an electric charge, and wherein the second configuration comprises the plurality of electrical devices configured such that they are connected electrically in a series configuration with each other, and such that the series configuration is connected to said at least one light modulator, and wherein said control circuitry is further configured to switch between the second configuration and the first configuration by connecting electrically each of the plurality of electrical devices to an electrically parallel configuration with each other over a predetermined time period.

3. The device according to claims 1 or 2, wherein said plurality of electrical devices comprises three or more capacitors.

4. The device according to claims 1 or 2, wherein said plurality of electrical devices comprises ten or more capacitors.

5. The device of claim 1, wherein the plurality of electrical devices comprise capacitors.

6. The device of claim 2, wherein the plurality of electrical devices comprise capacitors.

7. The device of claim 1, further comprising:

a display comprising said at least one light modulator;

said control circuitry connected to said display for controlling said interferometric modulator, wherein the control circuitry provides a substantially constant current to said light modulator to control said movable optical element;

a processor that is in electrical communication with said display, said processor being configured to process image data; and a memory device in electrical communication with said processor.

8. The device of claim 7, further comprising a controller configured to send at least a portion of said image data to said driver circuit.

9. The device of claim 8, further comprising an image source module configured to send said image data to said processor.

10. The apparatus of claim 9, wherein said image source module comprises at least one of a receiver, transceiver, and transmitter.

11. The apparatus of claim 10, further comprising an input device configured to receive input data and to communicate said input data to said processor.

* * * * *

UNITED STATES PATENT AND TRADEMARK OFFICE

CERTIFICATE OF CORRECTION

PATENT NO. : 7,499,208 B2
APPLICATION NO. : 11/182389
DATED : March 3, 2009
INVENTOR(S) : Marc Mignard It is certified that error appears in the above-identified patent and that said Letters Patent is hereby corrected as shown below:

On The Title Page, Item (73), please delete "UDC," and insert therefor --IDC,--.

On The Title Page, Item (57), line 3, please delete "interferornetric" and insert therefor --interferometric--.

At page 3, Item (56), line 10, please delete "Koichi" and insert therefor --Kimura--.

At page 3, Item (56), line 33, after "Coleman, Jr." please insert --deceased--.

At page 3, Item (56), line 48, please delete "Pichl et al." and insert therefor --Piehl et al.--.

At column 7, line 2, before "volt" please insert --10--.

At column 11, line 63, after "$t_1$" please insert --,--.

At column 12, approximately line 26, after "voltage" please insert --.--.

At column 12, line 66, please delete "$V_2$=O" and insert therefor --$V_2$=0--.

At column 13, line 3, please delete "$V_2$" and insert therefor --$V_2$ 53--.

At column 13, line 58, please delete "$V_2$ 52." and insert therefor --$V_2$ 53.--.

At column 13, line 63, please delete "$V_2$ 52." and insert therefor --$V_2$ 53.--.

At column 13, line 64, please delete "$V_3$ 53," and insert therefor --$V_3$ 52,--.

UNITED STATES PATENT AND TRADEMARK OFFICE

CERTIFICATE OF CORRECTION

PATENT NO. : 7,499,208 B2
APPLICATION NO. : 11/182389
DATED : March 3, 2009
INVENTOR(S) : Marc Mignard It is certified that error appears in the above-identified patent and that said Letters Patent is hereby corrected as shown below:

At column 15, line 33, in Claim 1, please delete “tat” and insert therefor --that--.

Signed and Sealed this

Sixth Day of October, 2009

David J. Kappos

*Director of the United States Patent and Trademark Office*